US008966455B2

(12) United States Patent  
Abadi et al.

(10) Patent No.: US 8,966,455 B2  
(45) Date of Patent: Feb. 24, 2015

(54) FLOW ANALYSIS IN PROGRAM EXECUTION

(71) Applicant: International Business Machines Corporation, Armonk, NY (US)

(72) Inventors: Aharon Abadi, Eilat (IL); Jonathan Bnayahu, Haifa (IL); Yishai Feldman, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 13/731,117

(22) Filed: Dec. 31, 2012

(65) Prior Publication Data

US 2014/0189656 A1     Jul. 3, 2014

(51) Int. Cl.  
 *G06F 9/44* (2006.01)  
(52) U.S. Cl.  
 CPC ....................... *G06F 8/20* (2013.01)  
 USPC .......................................... 717/133  
(58) Field of Classification Search  
 USPC .......................................... 717/133  
 See application file for complete search history.

(56) References Cited

U.S. PATENT DOCUMENTS

| 7,032,221 | B1* | 4/2006 | Chapman et al. | 718/100 |
| 2004/0083460 | A1* | 4/2004 | Pierce | 717/131 |
| 2005/0171976 | A1* | 8/2005 | West et al. | 707/104.1 |
| 2009/0055798 | A1* | 2/2009 | Chan et al. | 717/110 |
| 2009/0328007 | A1* | 12/2009 | Chen et al. | 717/128 |
| 2010/0205592 | A1* | 8/2010 | Sankaranarayanan et al. | 717/160 |
| 2011/0055819 | A1* | 3/2011 | Doyle et al. | 717/156 |
| 2012/0096444 | A1* | 4/2012 | Wright et al. | 717/137 |
| 2012/0221884 | A1* | 8/2012 | Carter et al. | 714/2 |

OTHER PUBLICATIONS

Sharir et al., "Two Approaches to InterProcedural Data-Flow Analysis", pp. 189-233, In Jones and Muchnik, editors, Program Flow Analysis: Theory and Applications. Prentice-Hall, 1981.

Field et al., "Identifying Procedural Structure in Cobol Programs", PASTE '99 Proceedings of the 1999 ACM SIGPLAN-SIGSOFT workshop on Program analysis for software tools and engineering, pp. 1-10, 1999.

Veerman et al., "Cobol Minefield Detection", Software: Practice and Experience, vol. 36, Issue 14, pp. 1605-1642, Nov. 25, 2006.

\* cited by examiner

*Primary Examiner* — Li B Zhen  
*Assistant Examiner* — Bradford Wheaton  
(74) *Attorney, Agent, or Firm* — David Zwick; Eyal Gilboa

(57) ABSTRACT

Machines, systems and methods for distinguishing feasible paths in a program by statically tracking one or more execution paths are provided. The method comprises reading one or more program statements in an execution path; adding a location identification for the program statement read to an abstract representation of the execution stack at the time the program statement is executed, in response to determining that the program statement is a procedure call; updating the abstract representations of the execution stack to exclude infeasible execution paths for a possible point in program where the procedure could return or continue, in response to determining that the program statement is a return from a procedure.

17 Claims, 10 Drawing Sheets

A. PERFORM A THROUGH B
   GO TO D

B. ...

C. PERFORM C THROUGH D

D. IF ... GO TO B

FLOW ANALYSIS IN PROGRAM EXECUTION

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to flow analysis in a computing environment and, more particularly, to a system and method for analyzing a program flow control.

BACKGROUND

Computer programming languages are used to write program code that causes a computer to execute a series of computing instructions in a certain order. A program code can be difficult to read and understand due to a variety of factors, including: the size of the program code, the nested nature of the procedural or functional calls in the program, the idiosyncrasies associated with the syntax and semantics of the associated programming language, the behavior of the corresponding compiler, etc.

Program analysis tools have been developed to help a human operator better understand a program code and to, for example, be able to systematically trace the path of execution in the code. Despite having the advantage of using such analysis tools, many program codes remain difficult to trace. For example, in a program code written in the COBOL programming language, determining the exact flow, between nested calls in paragraphs involving GOTO and PERFORM statements, can be very challenging.

Particularly, due to the manner a COBOL compiler follows the path from one statement in a call to another, when a call returns after the execution of a second call nested in a first call, a human operator tracing such program will have a hard time determining the valid or invalid paths. When a program code is being updated, it is important to know the valid and invalid paths. Otherwise, a piece of code may be modified creating a change in control flow that may cause the program to generate undesirable results.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Machines, systems and methods for distinguishing feasible paths in a program by statically tracking one or more execution paths are provided. In one embodiment an execution path is associated with an execution stack. The method comprises reading one or more program statements in an execution path; adding a location identification for the program statement read to an abstract representation of the execution stack at the time the program statement is executed, in response to determining that the program statement is a procedure call; updating the abstract representations of the execution stack to exclude infeasible execution paths for a possible point in program where the procedure could return or continue, in response to determining that the program statement is a return from a procedure.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

To determine the control flow in a program code, one or more execution paths may be traced by following the control flow or path that results from execution of the statements in the program code. Computer-aided analysis tools may be utilized to trace one or more execution paths for particular details. Depending on implementation and the nature of the programming language used to write the program code, the analysis tool may be used to detect problems in the program code.

In the following, exemplary methods and implementations are introduced in accordance with embodiments that may be configured for analyzing program code written in COBOL programming language, for example. It is noteworthy, however, that the general principals and methods disclosed herein may be equally applied in other scenarios that involve program code written in other languages. As such, the scope of the claimed subject matter is not to be construed as limited to the COBOL language, in particular, or the exemplary scenarios discussed below.

Figure 1:
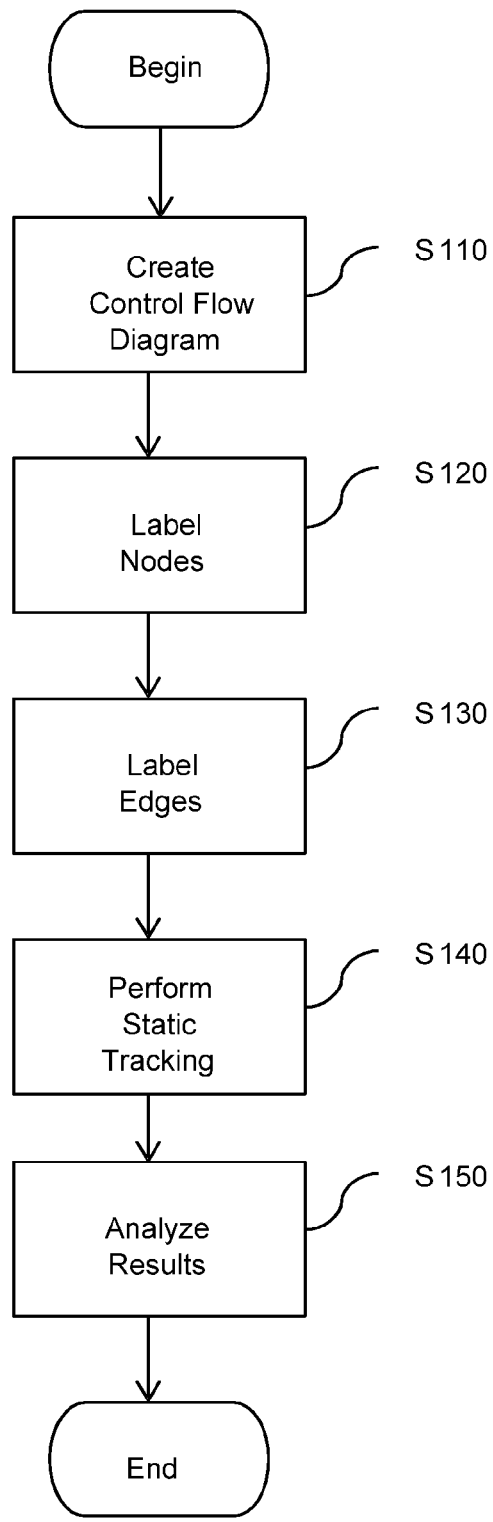
FIG. 1 is a flow diagram of an exemplary method for statically tracking and analyzing a program, in accordance with one or more embodiments.

Referring to FIG. 1, in accordance with an example embodiment, the tracking and analysis of a program code may involve the creation of a control flow diagram (S110), as provided in further detail below with respect to FIG. 2. The control flow diagram may be graphically represented as a series of nodes and edges connecting the nodes. A node may be implemented as a data structure (e.g., an array, a linked list, etc.), where one or more nodes correspond to one or more statements in the program code. As an example consider the following program code:

. . .
PERFORM A THROUGH B
loc:
. . .
GO TO D
A.
. . .
PERFORM C THROUGH D
. . .
B.
. . .
C.
. . .
IF Q GOTO B
D.
. . .

Figure 2:
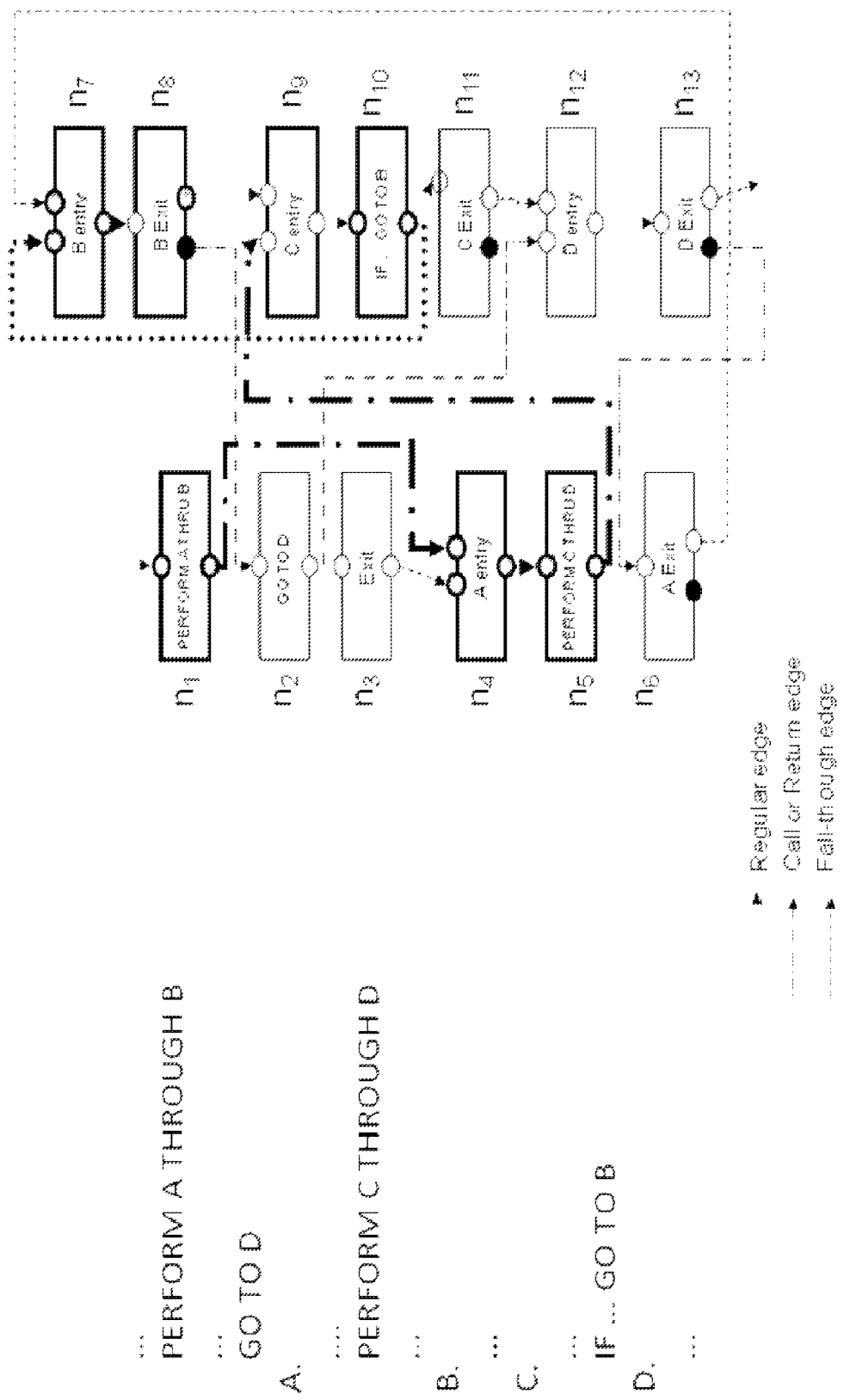
FIG. 2 is an exemplary graphical representation of control flow during the analysis of a program code, in accordance with one embodiment.

Referring to FIG. 2, similar to the above example, each line in the code (e.g., "PERFORM A THROUGH B" or "PERFORM C THROUGH D") may be represented by a separate node, for example, with an edge connecting a first node to a second node if the execution of the respective statements flows from the first node to the second node. The nodes in a control flow diagram may be sequentially labeled (e.g., n1, n2, etc.) (S120). In one implementation, a node's label serves as a location identifier for the corresponding program statement in the control flow diagram. The edges connecting the nodes may also be labeled to illustrate the possible execution paths in the code (S130).

In the example code above, when the statement PERFORM A THROUGH B is performed, the control flow reaches paragraph C (i.e., via the PERFORM C THROUGH D statement); and then if Q is true, the control is transferred to B. It is noteworthy that, as in most COBOL program execution, in the initial call from PERFORM A THROUGH B, the end of paragraph B is primed to return to loc, and not to fall though to the next paragraph C, as the programmer presumably intended here.

Thus, in the above scenario, when control reaches the end of paragraph B, during the PERFORM C THROUGH D call, control will return to loc instead of continuing to paragraph C. The above flow may violate the requirements in certain COBOL language manuals. Such errors may be difficult to identify, especially because a compiler generally may not be configured to identify such behavior.

Referring back to FIG. 1, to be able to more accurately identify possible errors in program code, in one embodiment, once the nodes and the edges are labeled, static tracking or analysis is performed (S140) and the results are analyzed (S150). The analysis, as it will be provided in further detail below with respect to FIGS. 3A through 3D, may help find the execution paths with potential errors that may identify unreachable nodes or invalid paths that result from improperly nested calls. To keep track of nested calls, when a call (e.g., PERFORM A THROUGH B) is encountered, a reference to that call is pushed onto a stack or other type of data structure suitable for such purpose.

Referring back to FIG. 2, for example, if node labeled n1 represents a point in the execution path where a first call (e.g., PERFORM A THROUGH B) is encountered, then a stack S1 associated with an execution path E1 will include n1 (i.e., n1 is pushed onto stack S1). As the control flow in the execution path E1 is traced, if a second call (e.g., PERFORM C THROUGH D) is encountered, while inside the first call, a reference to the point in the execution path E1 where the second call is encountered (e.g., node labeled n5) is pushed onto stack S1. Thus, the execution path E1, after encountering the second call may be associated with a stack S1 (i.e., S1={n1n5}) with n5 representing the top of the stack.

Depending on the other possible paths that may be taken during execution, the stack associated with a path may include additional references to the points in execution path where, for example, a new call is encountered. In one embodiment, when a call returns, the reference to the point in the execution path (e.g., a node label) is popped off the stack so that at each point in the execution, as tracked by the static analysis, it is possible to determine if a statement is being encountered within a nested call or a single call, for example.

In one implementation, more than one path of execution may be tracked. For example, a second execution path E2 may be tracked and associated with a stack S2 that includes n1. If execution path E2 overlaps a previously traced path (e.g., E1), then a set of stacks {S1, S2} is associated with the point in the path of execution where the overlap takes place. For example, a point in a path of execution in which two paths of execution cross may be associated with {n1n5, n1} representing the information tracked by the two stacks S1 and S2 under one scenario.

Accordingly, tracking the information associated with each point in execution may allow a static analysis of the various possibilities and states of calls during the execution of the code and may help one accurately determine which calls are nested at each point and when the calls return. In a large Cobol code, the various possibilities for paths of execution may result in a very complex matrix. To simplify, in one embodiment, a path of execution at each point may be limited to tracing only twice, for example.

In one embodiment, when the static analysis algorithm reaches an end of a paragraph, there are several possibilities according to COBOL semantics. One is to continue with one of the return edges; the other possibility is to continue with the fall through edge. If at the execution path the last incomplete statement (e.g., a nested PERFORM statement) ends at the current paragraph then the corresponding return is taken. If there is no incomplete statement that ends at the current paragraph, then the fall through edge is taken.

On the other hand, in at least one implementation, if there is an incomplete statement that ends at the current paragraph but it is not the last statement, then the behavior would be deemed undefined. In the example embodiments disclosed herewith respect to COBOL, in particular, program code with control flow that falls in the latter category is considered inappropriate or forbidden. In this example, program semantics are simulated using the sets of stacks disclosed to determine which stacks take the return edges and which stacks take the fall through edges.

Referring back to FIG. 2, an exemplary graphical illustration of the control flow for the program code disclosed earlier is provided in further detail. As shown, the statements in the program code are represented as nodes n1 through n13. It is noteworthy that the "Entry" and "Exit" statements are added to indicate the flow into and out of a statement. For example, "A Entry" indicates the start point of paragraph A; "A Exit" indicates the exit point of paragraph A. It is also noteworthy that the nodes are sequentially labeled in this example without regard to actual execution order.

For example, the first node in the control flow is labeled n1, the next node is labeled n2, and so on. A "regular edge" between two nodes identifies a flow of control during program execution, a "call edge" identifies a procedure call (e.g., a PERFORM call), a "return edge" identifies a return from a procedure call (e.g., return from a PERFORM call), and a "fall-through edge" identifies possible fall-through logic (i.e., a return that is not the result of a return from a call). The control flow edges, in one or more embodiments, may or may not cover the possible paths.

Figure 3A:
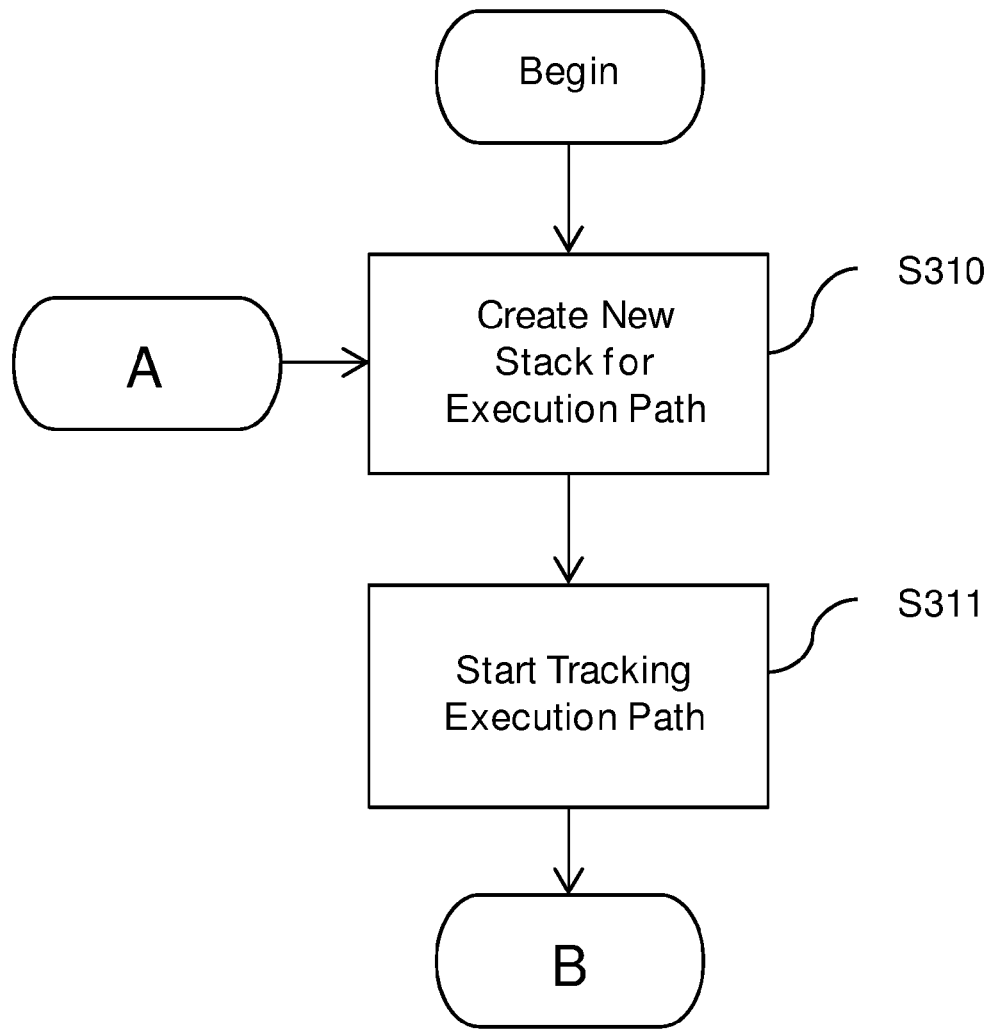
FIGS. 3A through 3D are flow diagrams that illustrate tracking and analyzing of a program, in accordance with one embodiment.
Figure 3B:
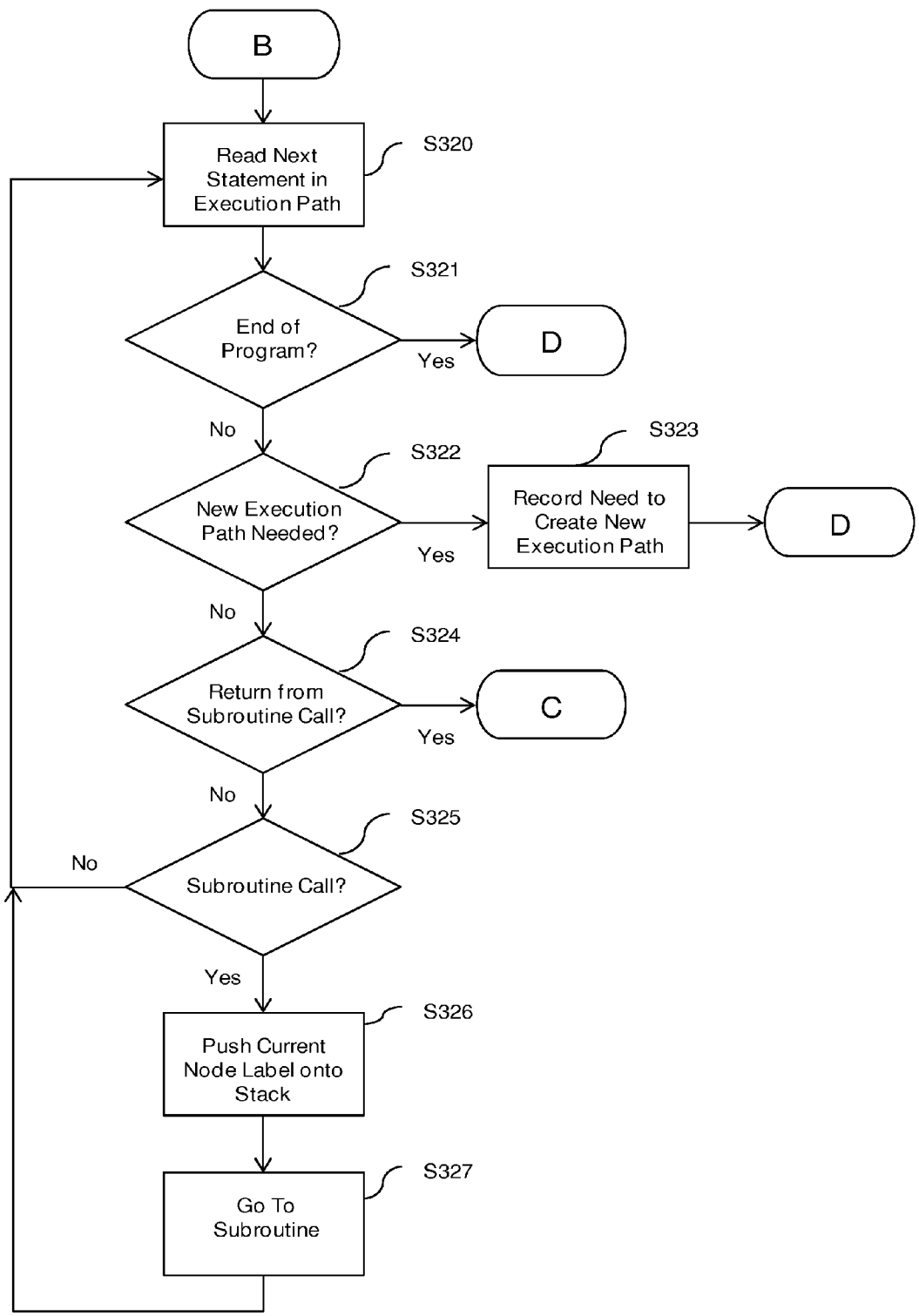
Figure 3C:
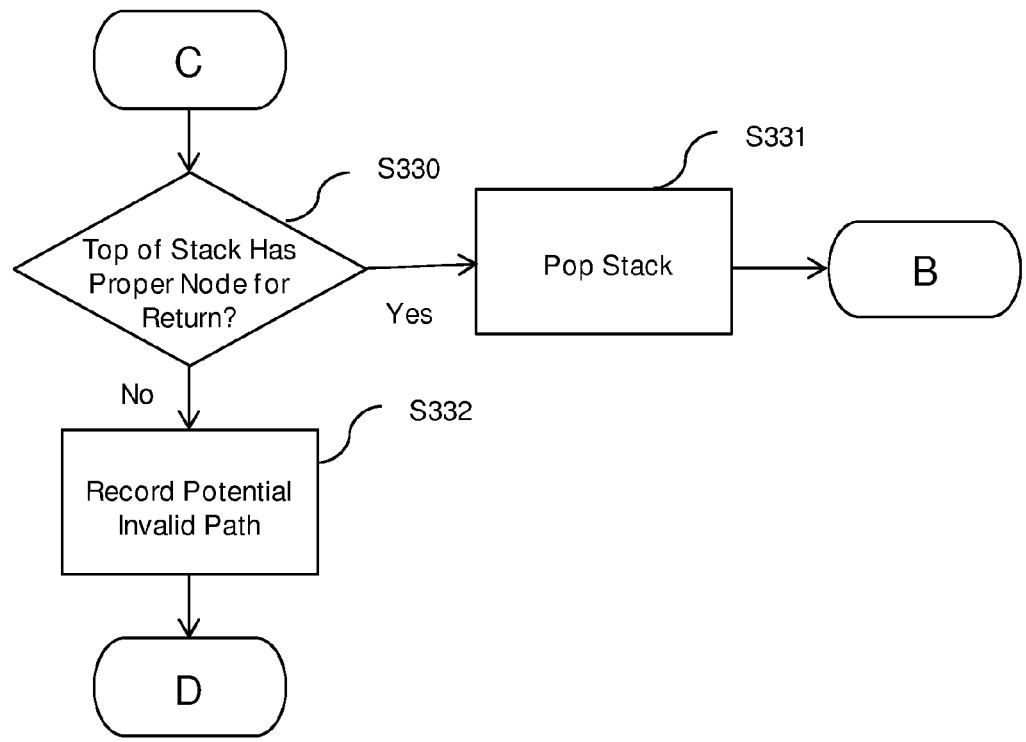
Figure 3D:
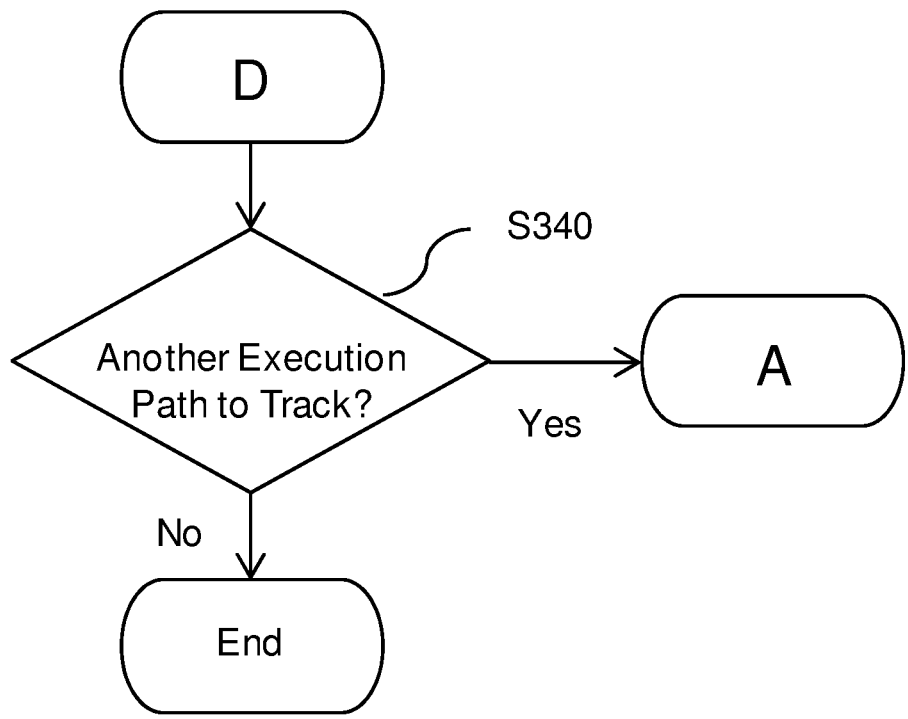
Figure 3E:
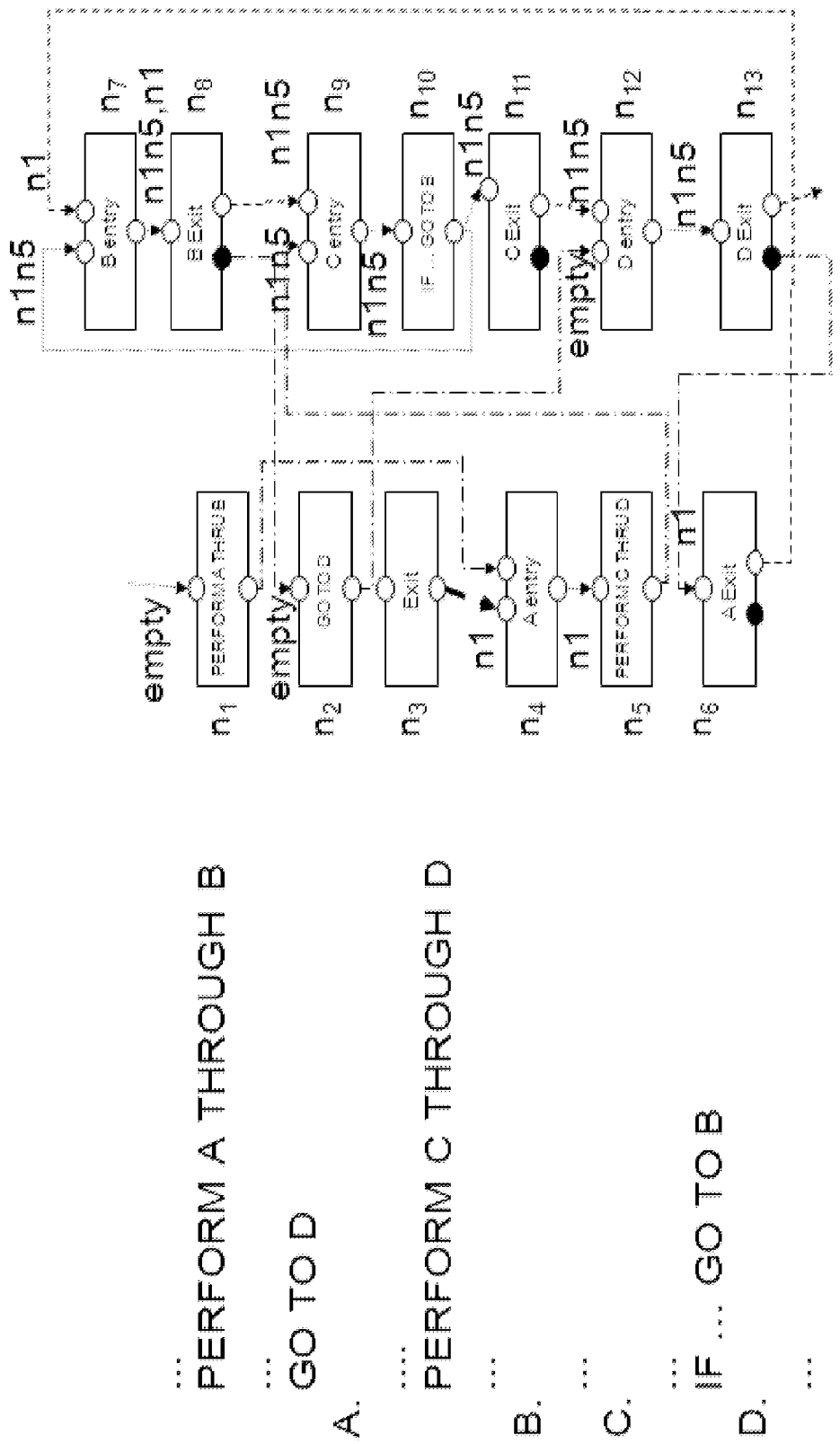
FIGS. 3E and 4 are flow diagrams that illustrate the analysis result of the program code, in accordance with one embodiment.

Referring to FIGS. 3A through 3E, exemplary scenarios for tracking possible execution paths for the program code illustrated in FIG. 2 are provided. As shown in FIG. 3A, a new stack for a selected execution path is created to allow for tracking the flow of control for the execution path (S310, S311). As shown in FIGS. 3B and 3E, for example, an execution path E1 may starts at node n1 (S320), at which point the new stack S1 is empty. When the procedure call PERFORM A THROUGH B is encountered (S325), execution path E1 would follow the path of the PERFORM call to node n4, which is the point of entry for paragraph A.

Upon entry into paragraph A, n1 is pushed onto stack S1 (S326) to indicate that the execution path follows from n1 (i.e., to identify that the control flow is nested in a call at node n1). Execution path E1 then follows a regular edge path to node n5 to perform a procedure call and read the next statement in the execution path (S327, S320). At node n5, the tracking encounters the PERFORM procedure call (PERFORM C THROUGH D) (S325). At this point, n5 is pushed onto stack S1 (S326) to indicate the execution path came from n5 (i.e., nested from a call at node n5), for example.

The execution flow from n1 to n5, thus produces a result in which the stack S1 includes two nodes n1 and n5. In an exemplary embodiment, the stack S1 at this point may be represented as {n1n5}, with n5 being on top of the stack and the most recent nested call. After updating the stack, execution path E1 follows the PERFORM procedure call to node n9 (S327), which is the point of entry for paragraph C. As shown, the next node in the execution path E1 is node n10 (S320). As discussed in further detail below, two separate paths may branch out from node n10.

In the exemplary embodiment shown in FIG. 3E, at node n10, the IF statement ("IF . . . GO TO B") presents two possible execution paths, depending on whether the condition is true or false. As such, two static tracking paths may be traced separately and independently from node n10 (S322, S323). If the condition at node n10 is true, the execution path E1 goes to node n7, entry of B ("GO TO B"). Here, the tracking continues with stack S1, which still has {n1n5}. Execution path E1 then falls through to node n8. At node n8, the tracking should return to n2 as it is done with the PERFORM A THROUGH B procedure call from n1 (S324).

It is noteworthy that in order to return to n2, the top of stack S1 needs to have n1 (i.e., to indicate that the previous call initiated from n1) so that the control returns to the statement right after n1 (i.e., n2). However, as provided earlier, in this exemplary instance, n5 and not n1 is at the top of stack S1. Thus, the top of the stack S1 may be said to include a node that does not seem to return the control flow during the execution to an expected point. However the stack S1 contains n1 hence there is unbalanced perform sequence. Such discrepancy, depending on implementation, may be reported to a human operator as an alert or to initiate further investigation.

Figure 4:
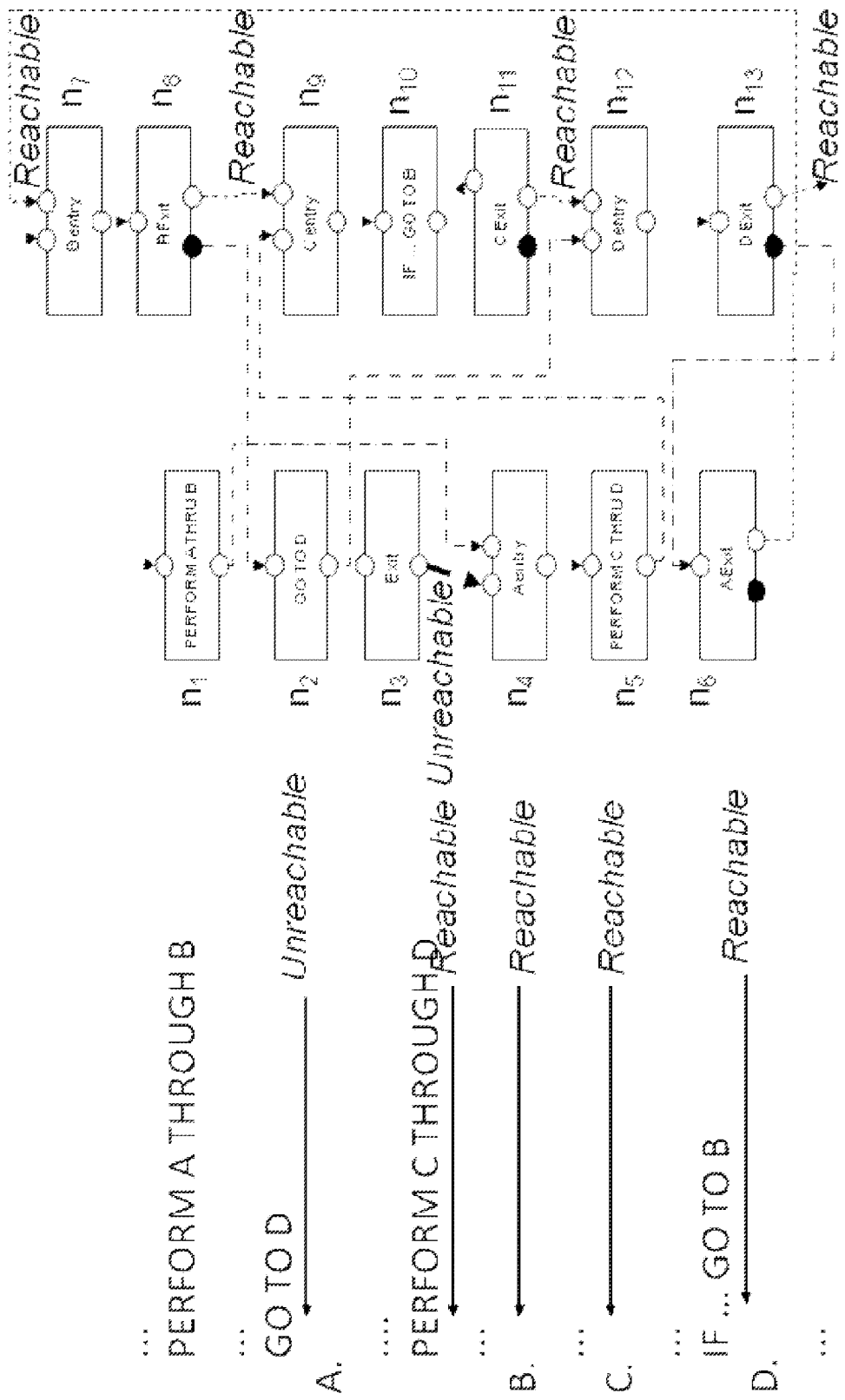

Returning back to the other possible path of execution at node n10, if the condition at node n10 is false, a second execution path E2 (S340, S311) may be followed to nodes n11, n12, and n13. In the second execution path, a new stack S2 is created to track the control flow for E2 (S310). Stack S2 starts with two nodes {n1n5} as execution path E2 originates from execution path E1, where E1 has {n1n5} in stack S1. At node n13, the tracking should return to n6 as it is done with the PERFORM C THROUGH D call from n5 (S324). If top of the stack has the proper node for return then n5 is popped from the stack S2 (S330, S331). Otherwise, a potential invalid path is recorded. Thus, the execution path E2 would continue at n6 (i.e., the node right after n5) and stack S2 being represented by {n1} at that point Execution path E2 then flows to node n7 (S320) and continues to node n8. It is noteworthy that at node n8, there are now stack S1 with {n1n5} and stack S2 with {n1}. At node n8, as discussed earlier, the tracking should return to n2 as it is done with the PERFORM A THROUGH B procedure call from n1 (S324). With stack S2 having n1 at the top, execution path E2 pops n1 from stack S2 and returns to n2 (i.e., the node right after n1) (S330, S331, S320). Stack S2 is now empty. Execution path E2 next encounters the GO TO D statement. It goes to node n12 and exits after node n13 (S321, S340). As shown in FIG. 4, reviewing the Exit nodes, the unreachable nodes of the program code may be identified. For example, as noted above, node n3 may be identified as potentially unreachable.

In the following, the possible execution paths in FIG. 3E are provided with a certain amount of detail to enable a person skilled in the art better understand the disclosed concepts claimed herein. As shown from the top, at the entry to n1 there is an empty stack. After n1 at the beginning of n4 there is a set with one stack that includes n1. After n5 at the left entry of n9 there is a set with one stack that includes n1n5. Then also at the beginning of n10 there is a set with one stack that includes n1n5. Continuing to n7 and also with n11 the flow of execution may be directed in different possible routes.

If the path toward the node n7 is followed, then at the beginning of n7 there is a set with one stack that includes n1n5. Also, at the beginning of n8 there is a set with one stack that includes n1n5. Node n8 is the end of paragraph, so it has to be decided whether to take the fall through or the return edge. As noted earlier, at this point it may be determined that there is n1 at the stack and n1 is to finish. However, n1 is not at the top of the stack which indicates an anomaly (in COBOL) and would result in the reporting of the identified problem, for example. Accordingly, the tracking may return if n1 is on top of the stack or not return because n1 is not on top of the stack.

If n1 is not on top of the stack, in this example, then the right entry of n9 will get a set that includes n1n5. The entry to n10 already contains n1n5 so the tracking will not continue in that direction. The next option is to continue with n11. Hence the beginning of n11 there is a set with one stack that includes n1n5. There are no return edges hence the fall-through edge is taken and at the right side of n12 there is stack that includes n1n5. Then at the entry of n13 the stack includes n1n5. n13 is the end of the paragraph. It is to be decided whether to take the fall through or return edge.

Since at this point, n5 is at the top of the stack and the return edge is the edge that corresponds to n5, the return edge is taken and n5 is removed from the stack and at the beginning of n6 there is a set of one stack that includes n1. Node n6 is the end of the paragraph and there are no return edges. Thus, the fall through edge is taken and at the right entry of n7 there is a stack that includes n1. At the left entry of n7 there is a stack that includes n1n5, hence at the entry of n8 there is a set of two stacks: the first one includes n1n5 and the second one includes n1.

Node n8 is the end of the paragraph, and therefore a determination is to be made as to whether to take the fall through or return edge. As noted, there are two stacks at this point: one with n1 at the top and the other with n1n5 at the top. In one embodiment, n1n5 is passed to n9. However, n1 is on the top of the second stack and n1 is the return edge corresponding to the call edge of n1. At this point, n1 is removed from the stack and the empty stack is passed to n2. A person skilled in the art, based on the exemplary scenarios provided above, would appreciate that the tracking of the execution path may continue to the other nodes in the same or similar manner.

In accordance with one embodiment, tracking the information associated with each point in execution would allow for static analysis of the various possibilities and states of calls during code execution and help determine which calls are nested at each point and when the calls return. In a large program code, the various possibilities for paths of execution may result in a very complex web of nodes and edges. To simplify, in one embodiment, at each point, at most two overlapping execution paths may be considered. That is, in one implementation, in order to solve a reachability problem, it may be sufficient to consider the perform sites, where each perform appears at most twice (i.e., at most two instance at the same stack are present at any time).

Theorem: Suppose that there is a path . . . Perform A through B . . . Perform A' through B' . . . . Suppose that Perform A through B finishes before finishing Perform A' through B'. Then there is a path that every "Perform" appears only twice.

Proof: Without the loss of generality, Perform A through B is the first Perform which finishes before finishing Perform A' through B'. If every perform appears only twice, then the proof is complete. Otherwise suppose that there is a Perform T that appears more than twice on the path, where T is a shortcut to T1 through T2 for some labels T1 and T2. Then the possibilities are:
1. Before Perform A through B there are two Perform T statements
2. Between Perform A through B and Perform A' through B' there are two Perform T statements
3. After Perform A' through B' and before the finish of Perform A through B there are two Perform T statements
4. There is Perform T before Perform A through B and between Perform A through B and Perform A' through B' and after Perform A' through B' and before the finish of Perform A through B In cases 1, 2 or 3 above, a path may be built such that Perform T through L appears twice. For example, if before Perform A through B there are two Perform T statements (i.e., Perform T . . . Perform T . . . . Perform A through B . . . . Perform A' through B'), one can take as a new path the prefix of the first Perform T and the suffix of the second Perform T and get a new path with one Perform T before Perform A through B. In case 4, we have . . . Perform T . . . Perform A through B . . . Perform T . . . Perform A' through B' . . . Perform T . . . finish Perform A through B . . . . One can build the path . . . Perform T . . . Perform A through B . . . Perform T . . . finish Perform A through B . . . from (*) it is a valid path.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 5A:
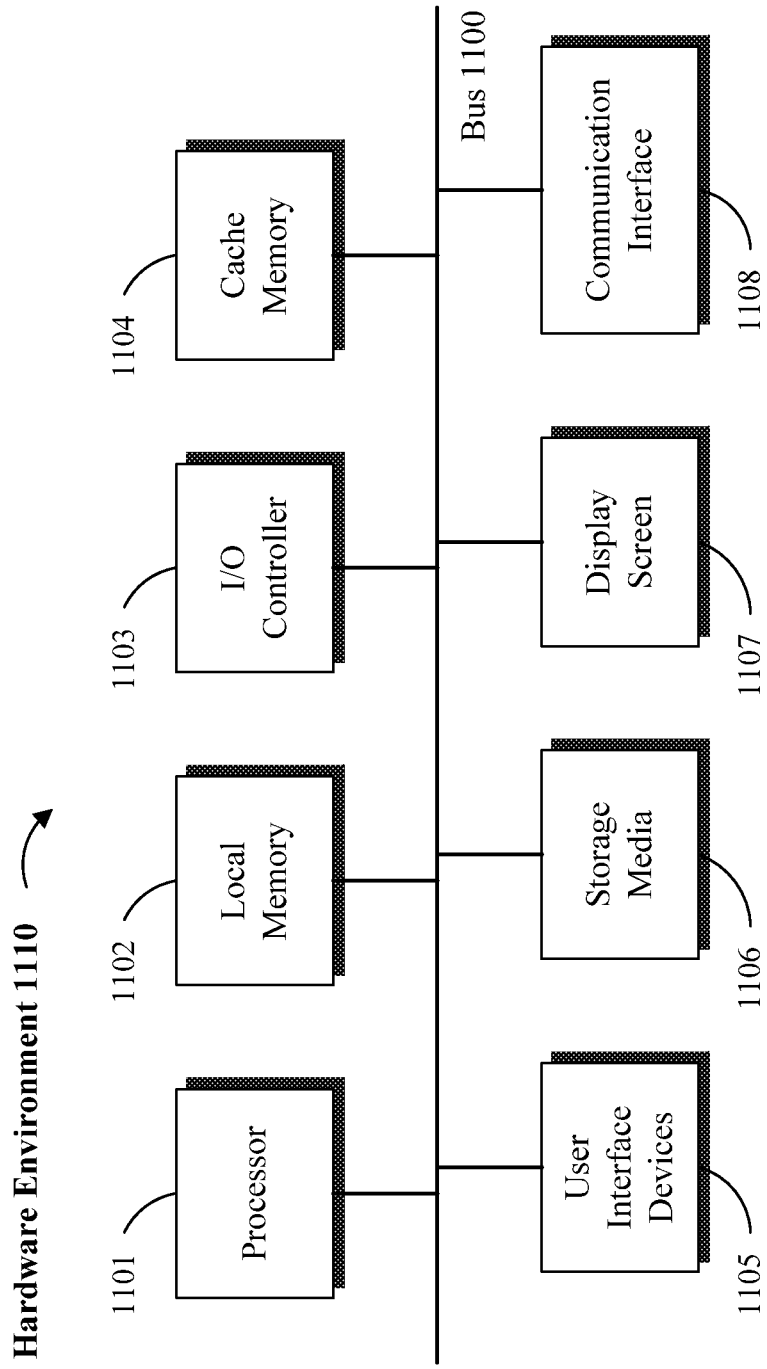
FIGS. 5A and 5B are block diagrams of hardware and software environments in which the disclosed systems and methods may operate, in accordance with one or more embodiments.
Figure 5B:
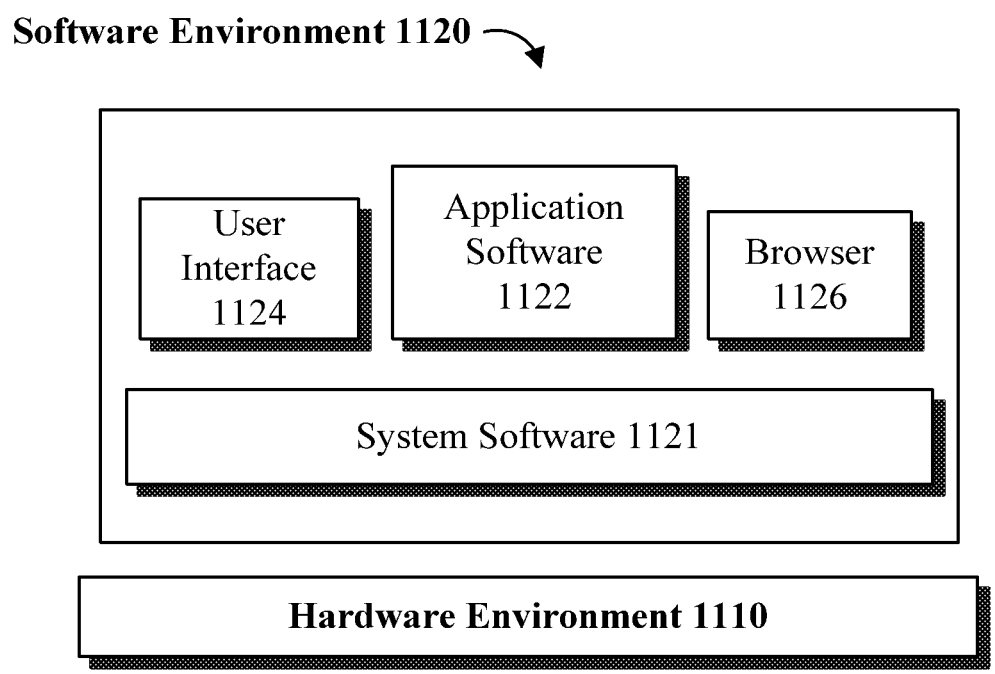

Referring to FIGS. 5A and 5B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 5A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-RAY), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 5B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for identifying infeasible execution paths in a program, the method comprising:
   identifying, by a computer, a plurality of execution paths in a program; and
   for each identified execution path in the program:
      reading a program statement in the execution path;
      in response to determining that the program statement is a procedure call, adding a location identification for the program statement read to a procedure call stack;
      in response to determining that the program statement is a return from a procedure:
         in response to determining that the most recently added location identification at the top of the procedure call stack corresponds to the return program statement, removing the most recently added location identification from the procedure call stack;
         in response to determining that the most recently added location identification at the top of the procedure call stack does not correspond to the return program statement:
            recording an infeasible execution path; and
            ending the reading of program statements in the execution path.

2. The method of claim 1 wherein the procedure call is a PERFORM statement in COBOL programming language.

3. The method of claim 1 wherein the size of the procedure call stack is limited based on defining a threshold for number of stack elements added to a stack, wherein a stack element is a location identification of the program statement for a procedure call.

4. The method of claim 1 wherein a threshold value limits the number of location identifications that are added to the procedure call stack for a same procedure call.

5. The method of claim 4 wherein the threshold value is two.

6. The method of claim 1 wherein the location identification of the program statement is a node number in a control flow diagram.

7. The method of claim 1 wherein an infeasible execution path is defined by a location identification that does not match the location of the program statement immediately before the program statement where the procedure call would return to.

8. The method of claim 1 wherein an infeasible execution path is a path in a static representation of program execution that is inconsistent with procedure call semantics in programming language used for implementing the program.

9. The method of claim 1 wherein identifying infeasible paths in the program further comprises identifying unreachable program statements in the program.

10. A computer system for identifying infeasible execution paths in a program, the computer system comprising one or more processors, one or more computer readable memories, one or more computer readable tangible storage media, and program instructions stored on at least one of the one or more storage media for execution by at least one of the one or more processors via at least one of the one or more memories, the program instructions comprising:
- program instructions to identify, by a computer, a plurality of execution paths in a program; and
- for each identified execution path in the program:
  - program instructions to read a program statement in the execution path;
  - in response to program instructions determining that the program statement is a procedure call, program instruction to add a location identification for the program statement read to a procedure call stack;
  - in response to program instructions determining that the program statement is a return from a procedure:
    - in response to program instructions determining that the most recently added location identification at the to of the procedure call stack corresponds to the return program statement, program instructions to remove the most recently added location identification from the procedure call stack;
    - in response to program instructions determining that the most recently added location identification at the to of the procedure call stack does not correspond to the return program statement:
      - program instructions to record an infeasible execution path; and
      - program instructions to end the reading of program statements in the execution path.

11. The computer system of claim 10 wherein the procedure call is a PERFORM statement in COBOL programming language.

12. The computer system of claim 10 wherein the size of the procedure call stack is limited based on defining a threshold for number of stack elements added to a stack, wherein a stack element is a location identification of the program statement for a procedure call.

13. The computer system of claim 10 wherein a threshold value limits the number of location identifications that are added to the procedure call stack for a same procedure call.

14. A computer program product, the computer program product comprising one or more non-transitory computer readable storage media and program instructions stored on at least one of the one or more non-transitory computer readable storage media, the program instructions comprising:
- program instructions to identify, by a computer, a plurality of execution paths in a program; and
- for each identified execution path in the program:
  - program instructions to read a program statement in the execution path;
  - in response to program instructions determining that the program statement is a procedure call, program instruction to add a location identification for the program statement read to a procedure call stack;
  - in response to program instructions determining that the program statement is a return from a procedure:
    - in response to program instructions determining that the most recently added location identification at the to of the procedure call stack corresponds to the return program statement, program instructions to remove the most recently added location identification from the procedure call stack;
    - in response to program instructions determining that the most recently added location identification at the to of the procedure call stack does not correspond to the return program statement:
      - program instructions to record an infeasible execution path; and
      - program instructions to end the reading of program statements in the execution path.

15. The computer program product of claim 14 wherein the procedure call is a PERFORM statement in COBOL programming language.

16. The computer program product of claim 14 wherein the size of the procedure call stack is limited based on defining a threshold for number of stack elements added to a stack, wherein a stack element is a location identification of the program statement for a procedure call.

17. The computer program product of claim 14 wherein a threshold value limits the number of location identifications that are added to the procedure call stack for a same procedure call.

* * * * *